United States Patent Office 3,516,847
Patented June 23, 1970

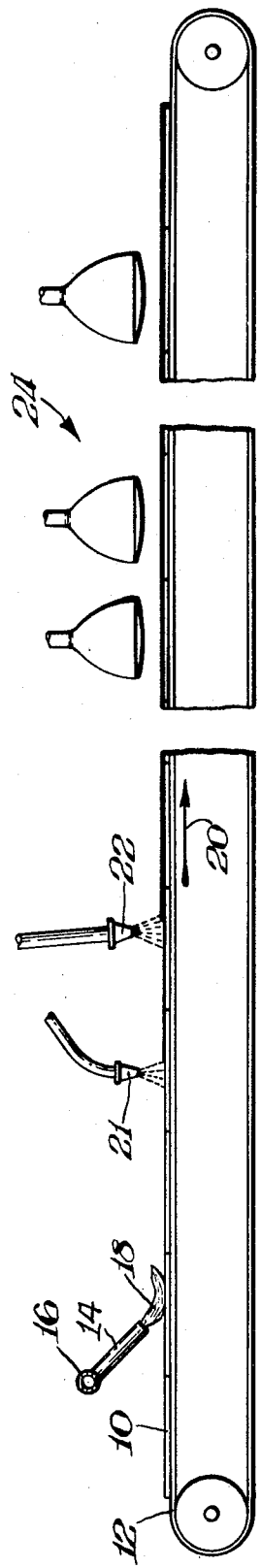

3,516,847
COATING CEMENTITIOUS ARTICLES
Ludwig K. Schuster, Dresher, and Singkata Tongyai, Warrington, Pa., assignors to Pennwalt Corporation, a corporation of Pennsylvania
Continuation-in-part of application Ser. No. 434,214, Feb. 23, 1965, now Patent No. 3,421,934. This application Feb. 7, 1966, Ser. No. 525,663
Int. Cl. C03c 25/00
U.S. Cl. 117—46       9 Claims

ABSTRACT OF THE DISCLOSURE

Cementitious articles like asbestos-cement panels have surface coated with very thin layer of resin containing in situ reduced chromic acid or water-soluble dichromate of a metal having a valence greater than one, by applying dispersion of these materials containing a suitable reducing agent. The surface is heated to 130 to 275° F., preferably by first flaming to at least 300° F. and then cooling it somewhat, and the coating dispersion is applied in multiple layers with intervening drying. In situ reduction is effected by final curing at about 250 to 475° F. Dispersions can have relatively low water content. Alternative coating technique uses coating mixture thickened to keep it from soaking in, and does not require preheating of surface.

---

The present application is a continuation-in-part of application Ser. No. 434,214 filed Feb. 23, 1965, now U.S. Pat. 3,421,934 granted Jan. 14, 1969.

The present invention relates to coatings on articles that, like cement and concrete, are bonded together by Portland cement. These articles are referred to herein as cementitious. Asbestos-cement layers, such as layers of the type used for structural material like siding shingles and panels, are particularly significant examples of the cementitious article.

Asbestos-cement layers of the foregoing type are made from mixtures of asbestos fibers and Portland cement, and like cement and concrete, are quite porous as well as quite alkaline. For some purposes, as for example when used as siding shingles, it is important to keep the porosity from extending completely through the thickness of the asbestos-cement layers. The prior art has developed coatings that can be applied to one surface of the layers to render that surface non-porous, but such coatings are time-consuming to apply or not sufficiently resistant to deterioration.

Among the objects of the present invention is the provision of improved techniques for coating on asbestos-cement layers or other porous alkaline materials like cement and concrete, and novel coated layers so made.

Another object is to provide coating formulations which are particularly useful for the foregoing purpose.

The foregoing as well as additional objects of the present invention will be more fully appreciated from the following description of several of its exemplifications, reference being made to the accompanying drawing in which the single figure is a somewhat schematic side view of a production line for carrying out the process of the present invention.

It has been discovered that an asbestos-cement layer can be readily and effectively coated by preheating the surface of the layer to a temperature from about 130° F. to about 275° F., applying over the surface while at that temperature an H coating mixture (as defined below) in an amount that causes the coating mixture to dry under the influence of the heat, applying additional H coating mixture until the combined coating is such that its thickness is at least about 0.4 mil after curing, and then curing the combined coatings.

It is particularly desirable to first effect the heating of the surface to a temperature of at least about 300° F., and then permit the temperature to drop to about 130 to 275° F., preferably about 130 to about 185° F. This gives uniformly good results with all kinds of asbestos-cement articles, even those that contain mineral oil or the like often used as a parting agent on press plates between which such articles are pressed so that they set in the desired shape.

The foregoing coating techniques are ideally suited for coloring the surface of the asbestos-cement article, one or more hiding pigments being then incorporated in the coating. Inorganic pigments are especially preferred for this purpose by reason of their durability and excellent weathering characteristics.

The heating of the present invention need only be to a depth to which the coating impregnates into the surface, and this can be as little as a few thousandths of an inch. Such heating of the uncoated surface is most readily accomplished by direct flaming of that surface, a treatment that can be effected in a few seconds.

Instead of carrying out the heating before the coating is applied, it can be effected after a preliminary coating which applies only a little coating formulation and accordingly does not become deeply absorbed.

Another effective coating technique pursuant to the present invention is to provide an H coating mixture having a viscosity adjusted to from about 60 to 100 centipoises measured at 78° F., applying to the surface of the asbestos-cement at ambient temperatures a thickness of the mixture that produces a final coating at least about 0.4 mil thick, and then curing the applied mixture on the layer.

For best results when used in applying either of the foregoing types of coatings pursuant to the present invention, the coating mixture can be quite concentrated, that is have low water content. Effective coating mixtures have a content of non-volatiles varying from about 5% to about 50% by weight, preferably 10% to 40% by weight.

It generally takes a minimum of 0.4 mil cured coating thickness to assure adequate imperviousness, and the more dilute coating mixtures take longer to build up this thickness whereas the more concentrated mixtures tend to have a relatively short pot life.

The H coating mixtures referred to above are aqueous dispersions of a resin containing a dissolved hexavalent chromium compound selected from the class consisting of chromic acid and water-soluble dichromates of metals having a valence greater than 1, and also containing a reducing agent compatible with the chromium compound when the mixture is applied but effective to reduce 40 to 95% of the chromium in the compound from hexavalent to trivalent condition when the mixture is dried and cured at a temperature of from about 250° to about 475° F. Coating mixtures of this kind are more fully described in U.S. Pats. 3,053,693 and 3,053,702, both granted Sept. 11, 1962, and the resins used in these coating mixtures can include polyacrylic acid as well as the more conventional hydrophobic resins mentioned in those patents. The polyacrylic acid is rendered hydrophobic by the curing operation to provide a very effective non-porous cured coating that acts as a positive moisture barrier. The resin dispersion can be a solution or emulsion. Additional resins that can be used in the H coatings are those described in U.S. Pats. 2,945,013 granted July 12, 1960; 2,973,285 granted Feb. 28, 1961; 2,998,330 granted Aug. 29, 1961; 3,083,177 granted Mar. 26, 1963; and 3,083,178 granted Mar. 26, 1963. Vinyl-acrylic and quaternary resins are very effective, particularly quaternized methacrolein polymers of the type used to treat nylon fibers for increasing their snag-resistance. The resins of U.S. Pats. 2,343,093 granted Feb. 29, 1944; 2,741,568 granted Apr. 10, 1956; and 2,744,130 granted May 1, 1956, are particularly desirable.

As pointed out in the foregoing patents, the proportion of resin to chromium compound should be between 5:1 and 1:5, only the equivalent $CrO_3$ content of the compound being considered in determining the ratio.

The following examples illustrate the practice of the present invention:

EXAMPLE I

A ¼ inch thick panel of asbestos-cement having a porosity of 16% is passed through an air oven where it is heated to a temperature of 275° F. As it emerges from the oven it is sprayed with the following H coating mixture applied in an amount of 3.5 grams per square foot:

|  | G. |
|---|---|
| 45 weight percent emulsion in water of the copolymer of 20% ethyl acrylate with 80% methyl methacrylate | 176.6 |
| Sugar | 2.45 |
| p-Nonyl phenoxy hexaethoxyethanol | 2.47 |
| 30% by weight dispersion of $TiO_2$ in water | 85.8 |
| ZnO | 14.78 |
| $CrO_3$ | 37.31 |
| Water | 169.2 |

The sprayed on coating dries and sets in about two seconds after which the layer with the set coating is given another spray coating in exactly the same way. This second coating dries and sets in about five seconds, and a third coating is then sprayed on. The third layer dries and sets in about fifteen seconds. Substantially none of the coating penetrates into the interior of the asbestos-cement layer, and the panel has a uniform coating stratum over one entire surface. The panel thus coated has a temperature of about 150° to 175° F., and is then passed under a bank of infrared lamps that bring the coating to a temperature of 425° F. for one second. This heating cures the coating, converting it to a thermosetting impervious stratum 0.55 mil thick that seals the pores in the coated asbestos-cement surface. The resulting panel makes a very satisfactory siding shingle and shows no fading of the color of the coating when so used.

EXAMPLE II

An asbestos-cement panel ³⁄₁₆ inch thick and having a porosity of 19% is maintained at 70° F. and sprayed while at that temperature with the following H coating mixture:

|  | G. |
|---|---|
| 46% by weight dispersion in water of an acrylate copolymer available as C-72 from the Rohm & Haas Company, Philadelphia, Pa. | 113.0 |
| Sugar | 18.94 |
| p-Nonyl phenoxy octa-ethoxy ethanol | 2.27 |
| 30% by weight dispersion of $TiO_2$ in water | 45.7 |
| 60% by weight dispersion of phthalocyanine green in water | 40.1 |
| ZnO | 22.5 |
| $CrO_3$ | 56.1 |
| Hydroxyethyl cellulose | 33.35 |
| Water | 199.65 |

This mixture has a viscosity of 87.5 centipoises at 78° F., and is sprayed on with a covering of 9.5 grams per square foot. The panel with the sprayed-on layer is then passed under and six inches away from an array of ceramic gas burners heated red hot, so that every part of the sprayed-on layer is under the burners for thirty seconds. This dries and cures the sprayed-on layer to form a hard non-porous coating 0.45 mil thick that permits the panel to be used for siding or other structural members.

For use as external structural members, the coatings of the present invention are preferably arranged to be on the outside surface of the asbestos-cement panels, and in such applications the binder used in the coating is desirably a hard resin, as for example methyl methacrylate, or cationic acrylics, or thermosetting acrylics such as those described in U.S. Pats. 2,866,763 granted Dec. 30, 1958, and 2,918,391 granted Dec. 22, 1959.

With the techniques of Example I or Example II, essentially all the solid coating ingredients in the cured coatings remain on the surface of the panel and there is no problem with penetration into its interior. Such penetration is undesirable because it tends to make the panel non-porous throughout its thickness, whereas for structural purposes it is preferred for such panels to be completely porous except at one surface. In general, the porosity can vary from about 5% to 20%, that is there can be that proportion of voids in the asbestos-cement layer.

Any kind of H coating mixture can be used to make the coatings of the present invention, but purely inorganic pigments such as iron oxides, chromium oxides, lead chromates, carbon and the like are preferred for coatings exposed to the weather inasmuch as they show substantially no fading. Also the various layers used to make a single coating need not have the same pigment and the topmost layer can even have a purely resin-pigment type of formulation without the hexavalent chromium-reducing agent combination which tends to impart a greenish cast to the cured coating. In this way a perfectly white coating can be obtained.

The coating mixture formulations of the type of Example II can have many different kinds of thickening agents such as carboxylethyl cellulose, carboxymethyl cellulose, bentonite, locust bean gum, polyethylene glycols having molecular weights above 9000, and the like. such polyethylene glycols are used in greater proportion than methyl cellulose or carboxymethyl cellulose, or locust bean gum, but these glycols are substantially completely oxidized during the curing operation so that they have substantially no deleterious effect on the final action. Bentonite also has very little effect, particularly if the curing is carried out at about 400° F. for a long time, long enough to thoroughly dehydrate it. Carboxymethyl cellulose and methyl cellulose tend to impair the water-imperviousness of the coating somewhat. Instead of spraying the coating formulations, they can be applied by other methods including roller coating, brushing, and the like.

The asbestos-cement layers coated in accordance with the present invention can also have curved surfaces and can even be in the form of rods or pipes. Pipes of such construction can have their interior or external surfaces, or both, coated and the coating can penetrate the entire pipe wall thickness, though this is not desired because of the relatively large quantity of coating material that would be required.

Other examples of coating formulations that can be applied as in the technique of Example I, are:

EXAMPLE III

|  | G. |
|---|---|
| Alkyd resin emulsion available as "Synthemul 1505" from Reichhold Chemicals, Inc., and having from 45% resins in solid water | 171.0 |
| Polyethoxylated long chain fatty acid available as "Emulfor on 870" from Antara Chemicals | 8.0 |
| Polyethylene glycol having a molecular weight of about 9000 | 4.85 |
| Black iron oxide pigment 40% dispersed in water | 132.5 |
| ZnO | 15.28 |
| $CrO_3$ | 38.55 |
| Water | 159.0 |

EXAMPLE IV

| | G |
|---|---|
| 20% polyacrylic acid solution in water, the polymer having a molecular weight of about 110,000 | 285.0 |
| Polyethylene glycol having a molecular weight of about 300 | 3.28 |
| 25% by weight dispersion of $TiO_2$ in water | 91.57 |
| Chrome yellow pigment paste | 20.0 |
| Molybdated chrome orange pigment paste | 22.0 |
| $CrO_3$ | 35.1 |

EXAMPLE V

| | G |
|---|---|
| Resin of Example 2 in U.S. Pat. 2,741,568 as 30% dispersion in water by weight | 178.0 |
| Sugar | 13.72 |
| ZnO | 15.87 |
| $CrO_3$ | 40.05 |
| Brown iron oxide pigment paste | 41.0 |
| 20 weight percent $TiO_2$ dispersion in water | 68.0 |
| Water | 115.9 |

An important feature of this present invention is the coating of asbestor-cement roofing materials with the H type coatings.

Asbestos-cement roofing materials are produced in a great variety of flat and corrugated shapes. As explained above, mineral oil is generally used as a parting agent for these shapes, to permit proper separation of the shapes from the metal plates used to press them. This oil contaminates the surface of the roofing plates and seriously interferes with the production of good adherent coatings. Freeing the roofing plates of the oil as by extraction with a solvent, or heating of the shapes above the boiling point of the oil for such a length of time that the oil is evaporated off, is both time consuming and expensive.

It has been found that the ill effects of the oil and other surface contaminants, such as poor adhesion, can be completely eliminated my singeing the asbestos-cement surface with gas flames. Such singeing not only eliminates the bad effects of the oil, but simultaneously provides the preheating in one very economical step. Singeing is preferably accomplished with propane gas burners mounted above a conveyor on which the asbestos plates or shapes are carried, the burners being mounted so that an oxidiz-flame impinges on the entire surface of the asbestos cement. The surface temperatures under the flames should be at least about 300° F., but good results are also obtained at 290° F. Singeing temperatures at least as high as 700° F. are suitable, but the higher the temperature the longer must the plate cool. The following examples illustrates one convenient operation in accordance with the drawing:

EXAMPLE VI

Flat asbestos-cement roofing plates 10, 5 millimeters thick and 20 x 20 centimeters in length and width, were placed on a conveyor 12 as shown in the figure, the conveyor having a width of about 1 meter. The plates were placed five abreast and in continuous rows so that they covered the entire width of the conveyor. Five propane gas-fired burners 14 are mounted in a transverse row at a distance of about 8 centimeters from the plates and pointed downwardly at an angle of 45° in the direction of conveyor movement shown by arrow 20. The plates were moved at a conveyor speed of 5.5 meters per minute. The flames 18 from the burners impinge on the plates and spread about 6 inches longitudinally and 4 inches transversely on each side. The surface temperature under the flames was 300 to 360° F.

The surface temperature of the plates after traveling 5 meters from the flames was 131 to 167° F., and at that temperature the plates were sprayed with the following coating mixture, using an oscillating atomizing paint spray nozzle 21 0.0425 inch in diameter:

| | G. |
|---|---|
| Resin dispersion of Example II | 1351 |
| Sugar | 200 |
| p-Dodecyl phenoxy octa-ethoxy ethanol | 19.3 |
| 35% by weight dispersion of $TiO_2$ in water | 285 |
| 28% by weight dispersion of carbon black in water | 495 |
| Aqueous acid zinc chromate solution containing 12.8% ZnO by weight and 32.3% $CrO_3$ by weight | 1500 |
| Water to make 1 gallon. | |

The mixture was supplied to the nozzle at 8 pounds per square inch gauge, and air was supplied at 60–65 pounds per square inch gauge. A second nozzle 22 of the same type mounted 1 meter further along the conveyor applied a second coating of the same mixture. The plates were dried for 10 minutes and then carried under an electrically heated bank of infrared lamps 24 where they were cured at 425° F. The temperatures at the plate surface are readily measured by marking them with conventional melting crayons and observing the streaks. Very uniformly coated plates of excellent weatherability were obtained, the coating weighing 80 grams per square meter before drying. Similar results are obtained with corrugated asbestos-cement roofing plates, the coating nozzles being then oscillated in a direction parallel to the corrugations.

A much less expensive black coating can be obtained if instead of carbon black, black iron oxide ($Fe_3O_4$) is used. A suitable iron oxide dispersion can be made as follows:

EXAMPLE VII

Dissolve 20 grams of hydroxypropyl methyl cellulose in 380 grams water at 50° C., add 4 grams of a 20% by weight solution of p-nonylphenoxy octa-ethoxy ethanol in water, and then add 242 grams of pigment grade black iron oxide ($Fe_3O_4$). The resulting mixture is then subjected for about 5 minutes to the action of an Eppenbach mixer rotary homogenizer. A highly effective and stable black dispersion containing about 39.5% $Fe_3O_4$ by weight is obtained.

This black pigment dispersion is well suited to make colored coating formulations for the present invention. The following two examples are illustrative:

EXAMPLE VIII

| | G. |
|---|---|
| Resin of Example II | 1304 |
| Sugar | 205.3 |
| p-Nonylphenoxy decaethoxy ethanol | 22.3 |
| 35% by weight dispersion of $TiO_2$ in water | 294 |
| Iron oxide dispersion of Example VII | 684 |
| Acid zinc chromate solution of Example VI | 1563 |
| Water to make 1 gallon. | |

This formulation provides a uniform grey coating of pleasing appearance and good hiding characteristics.

EXAMPLE IX

The formulation of Example VIII is followed except that the $TiO_2$ dispersion is omitted. The coating produced by such a modified formulation has a blackness almost as intense as that produced with carbon black, but with lower gloss and good hiding.

The ten minute drying time of Example VI can advantageously be shortened as by passing the plates through a low temperature oven at about 250° F., before they reach the high temperature curing station.

The presence of free water in the asbestos-cement articles when they are coated causes the coating to be absorbed into the coated surface. This is undesirable and it is accordingly very helpful to make sure these articles are dry at that time. A small amount of free water can be tolerated, however, where the initial coating application is of such small amount as not to penetrate deeply into the asbestos-cement body. Thus a coating can be applied in an amount that deposits about 30 milligrams of solids per square foot on an asbestos-cement plate containing as much as 10% free water, but this will not provide good coloring unless the plate is then heated to the 130° F. minimum temperature referred to above, and additional coating then applied. This heating will dry the coated surface sufficiently to keep the subsequent coatings from being absorbed into the interior.

In Examples I, II, III, and V, the chromic acid is first dissolved in some of the water and then the ZnO is added slowly with agitation, until it is also dissolved.

Any of the formulations of Examples I, III through VI, VIII, and IX can be used in the coating technique of Example II by merely thickening the formulation to the specified viscosity range by one of the above-mentioned thickneners.

Obviously many modifications and variations of the present invention are possible in the light of the above teachings. It is, therefore, to be understood that within the scope of the appended claims the invention may be practiced otherwise than as specifically described.

What is claimed:

1. A method for applying a coating to a structural asbestos-cement layer, said method including the steps of preheating only the surface of the layer to a temperature of 300 to 700° F., then cooling that surface to a temperature from about 130 to about 275° F., applying over the surface while at the last-mentioned temperature an aqueous coating dispersion of a resin, chromic acid or a water-soluble dichromate of a metal having a valence greater than 1, and a reducing agent compatible with the chromium compound in the dispersion but causing 40 to 95% of the chromium to be reduced to trivalent condition on curing, the coating dispersion being applied in an amount that causes the coating mixture to spontaneously set and dry under the influence of the heat, and then curing the coating.

2. The method of claim 1 in which the cured coating has a thickness of about 0.4 mil.

3. The method of claim 1 in which the coating dispersion contains a hiding pigment that colors the surface.

4. The method of claim 3 in which the coating dispersion has a non-volatile content between 10 and 40% by weight.

5. The method of claim 1 in which the asbestos-cement layer is one that contains mineral oil.

6. The method of claim 5 in which the surface heating is effected by direct impingement of a high temperature oxidizing gas flame.

7. The method of claim 5 in which the cooling after the initial heating of the surface is to a temperature of from about 130 to about 185° F.

8. The method of claim 7 in which the hiding pigment is an inorganic one.

9. The product produced by the method of claim 8.

References Cited

UNITED STATES PATENTS

| | | |
|---|---|---|
| 2,354,351 | 7/1944 | Schuetz. |
| 2,588,828 | 3/1952 | Greiner. |
| 2,845,364 | 7/1958 | Waggoner _____ 117—46 |
| 3,053,702 | 9/1962 | Schuster et al. _____ 148—6.2 |

ALFRED L. LEAVITT, Primary Examiner

M. F. ESPOSITO, Assistant Examiner

U.S. Cl. X.R.

117—54, 123, 126